United States Patent
Mehrholz et al.

(10) Patent No.: US 11,423,656 B2
(45) Date of Patent: Aug. 23, 2022

(54) SITUATION RECOGNITION DEVICE, AIRCRAFT PASSENGER COMPARTMENT AND METHOD FOR SURVEILLANCE OF AIRCRAFT PASSENGER COMPARTMENTS

(71) Applicant: Airbus Operations GmbH, Hamburg (DE)

(72) Inventors: Holger Mehrholz, Kreetslag (DE); Joern Stuebner, Kreetslag (DE)

(73) Assignee: Airbus Operations GmbH, Hamburg (DE)

( * ) Notice: Subject to any disclaimer, the term of this patent is extended or adjusted under 35 U.S.C. 154(b) by 306 days.

(21) Appl. No.: 16/832,895

(22) Filed: Mar. 27, 2020

(65) Prior Publication Data

US 2020/0311437 A1 Oct. 1, 2020

(30) Foreign Application Priority Data

Mar. 28, 2019 (DE) .................. 102019204359.3

(51) Int. Cl.
*G06V 20/00* (2022.01)
*G06V 20/52* (2022.01)
*B64D 45/00* (2006.01)
*G06N 20/00* (2019.01)
*G06V 20/40* (2022.01)

(52) U.S. Cl.
CPC ......... *G06V 20/52* (2022.01); *B64D 45/0053* (2019.08); *G06N 20/00* (2019.01); *G06V 20/40* (2022.01)

(58) Field of Classification Search
CPC ........ G06V 20/52; G06V 20/40; G06N 20/00; B64D 45/0053
See application file for complete search history.

(56) References Cited

U.S. PATENT DOCUMENTS 7,868,912 B2 1/2011 Venetianer et al.
8,589,994 B2 * 11/2013 Monroe ............. H04B 7/18504
340/963
(Continued)

FOREIGN PATENT DOCUMENTS

CN 107 600 440 1/2018
DE 44 16 506 11/1995
(Continued)

OTHER PUBLICATIONS

International Search Report cited in 10 2019 204 359.3 dated Mar. 20, 2020, 8 pages.
(Continued)

*Primary Examiner* — Pakee Fang
(74) *Attorney, Agent, or Firm* — Nixon & Vanderhye P.C.

(57) ABSTRACT

A situation recognition device (10) including a surveillance processor (1) and an AI system (3). The surveillance processor receives visual and/or acoustic surveillance signals (E) from an aircraft passenger compartment (20) via an input interface (7). The AI system (3) includes an AI processor (4), a rule set generator (5) based on self-learning algorithms, and a reference rule set memory (6). The AI system is in bidirectional data communication with the surveillance processor (1). The AI processor (4) checks, upon a request (Q) from the surveillance processor (1), data patterns in the received visual and/or acoustic surveillance signals (E) for deviations from data patterns in a reference rule set (R) stored in the reference rule set memory (6). The surveillance processor (1) outputs indicator signals (A) via the output interface (8) if deviations determined by the AI processor (4) exceed one or more predefinable deviation threshold values.

9 Claims, 1 Drawing Sheet

(56) References Cited

U.S. PATENT DOCUMENTS

| | | | |
|---|---|---|---|
| 9,111,148 B2 | 8/2015 | Seow et al. | |
| 2003/0206102 A1* | 11/2003 | Joao | B64D 45/0031 340/425.5 |
| 2003/0209893 A1 | 11/2003 | Breed et al. | |
| 2004/0107027 A1* | 6/2004 | Boudrieau | B64D 45/0015 701/1 |
| 2004/0143602 A1 | 7/2004 | Ruiz et al. | |
| 2008/0031491 A1 | 2/2008 | Ma et al. | |
| 2022/0005332 A1* | 1/2022 | Metzler | G06N 3/02 |

FOREIGN PATENT DOCUMENTS

| | | |
|---|---|---|
| DE | 11 2011 102 294 | 5/2013 |
| EP | 3 059 722 | 8/2016 |
| EP | 3 686 867 | 7/2020 |
| WO | 2015/155379 | 10/2015 |

OTHER PUBLICATIONS

"Airbus and Zodiac Aerospace Enter Into a Partnership for New Lower-Deck Sleeping Facilities", Apr. 10, 2018, 1 page.

Ali Ali, "Application of the Bayes Rule for Enhancing the Performance of the Bagging Ensemble to Detect Abnormal Movements Onboard an Aircraft", Journal of Theoretical and Applied Information Technology, Dec. 31, 2016, vol. 94, No. 2, 11 pages.

European Search Report cited in GB 2004456.6 dated Sep. 17, 2020.

Examiner's Requisition cited in Application No. 3,076,731 dated May 5, 2022, 4 pages.

* cited by examiner

SITUATION RECOGNITION DEVICE, AIRCRAFT PASSENGER COMPARTMENT AND METHOD FOR SURVEILLANCE OF AIRCRAFT PASSENGER COMPARTMENTS

RELATED APPLICATION

This application claims priority to German Patent Application DE 102019204359.3; filed Mar. 28, 2019, the entirety of which is incorporated by reference.

TECHNICAL FIELD OF THE INVENTION

The invention relates to a situation recognition device and to a method for automated surveillance of processes and situations, in particular for automated recognition of hazard situations in passenger compartments of aircraft.

TECHNICAL BACKGROUND

In public transport such as passenger aircraft, for instance, it is necessary to monitor processes on board in order that, in the event of deviations from prescribed travel or transport conditions, near-instantaneous countermeasures adequate to the situation can be initiated by the on-board personnel. For this purpose, it is known for dynamically generated image or sound material in the interior of the means of transport to be evaluated by human assessment. Precisely in passenger aviation it is desirable to be able to recognize and assess unusual travel or transport conditions quickly. This usually necessitates monitoring by on-board personnel, and the continuity and omnipresence of the latter cannot be continuously ensured given the multiplicity of spaces, situations and processes to be monitored.

In order to be able to offer a presorting and initial assessment of unusual travel or transport conditions for human on-board personnel, approaches for automation of surveillance processes therefore exist. It is thereby possible for machine-generated situation indicators abstracted from the actual situation to be obtained, which can be subjected to more extensive checking by the on-board personnel.

U.S. Pat. No. 7,868,912; U.S. Published Patent Application 2008/0031491 and U.S. Pat. No. 9,111,148 disclose adaptively learning pattern recognition devices for video surveillance systems. Chinese patent document CN 107 600 440 A discloses a video surveillance system for recognizing improper behaviour on the part of passengers. German patent document DE 44 16 506 A1 discloses lower deck passenger compartments for aircraft.

SUMMARY OF THE INVENTION

The inventors conceived and disclosed here solutions for automated recognition of situations or processes such as in a passenger compartment of an aircraft, for instance, which enable human on-board personnel of the aircraft to acquire information about the occurrence of potentially unusual situations or processes more quickly and more efficiently.

A situation recognition device is disclosed that comprises a surveillance processor having an input interface and an output interface, said surveillance processor being designed to receive visual and/or acoustic surveillance signals from an aircraft passenger compartment via the input interface. The situation recognition device additionally includes an AI system comprising an AI processor, a rule set generator based on self-learning algorithms, and a reference rule set memory, said AI system being in bidirectional data communication with the surveillance processor. The AI processor is designed to check, upon a request from the surveillance processor, data patterns in the received visual and/or acoustic surveillance signals for deviations from data patterns in a reference rule set stored in the reference rule set memory. The surveillance processor is designed to output indicator signals via the output interface if the deviations determined by the AI processor exceed one or more predefinable deviation threshold values.

An aircraft passenger compartment, in particular a lower deck passenger compartment (LDC), is disclosed that includes a situation recognition device in accordance with the first aspect of the invention, one or more surveillance cameras coupled to the input interface of the surveillance processor and designed to transmit visual and/or acoustic surveillance signals in real time to the surveillance processor, and a warning device, which is coupled to the output interface of the surveillance processor and which is designed to indicate to a user, depending on received indicator signals from the surveillance processor, warning indications about a potential hazardous situation in the aircraft passenger compartment.

A method for automated surveillance of processes and situations in aircraft passenger compartments is disclosed that has the steps of receiving visual and/or acoustic surveillance signals from an aircraft passenger compartment by means of a surveillance processor, checking the received visual and/or acoustic surveillance signals for deviations from a reference rule set stored in a reference rule set memory of an AI system and generated by a rule set generator based on self-learning algorithms, by means of an AI processor of the AI system, and outputting indicator signals by means of the surveillance processor if the deviations determined by the AI processor exceed one or more predefinable deviation threshold values.

Algorithmic machine learning may be used to monitor and assess observable information about situations and processes in an aircraft passenger compartment with regard to potential deviations from patterns and regularities in dynamically and constantly gathered information data. A system of artificial intelligence (AI system) is used for this purpose, which system is initialized with corresponding training data about the patterns and regularities of situations and processes in the aircraft passenger compartment. Gathered information data such as video or audio recordings, for instance, are arbitrated by the AI system in real time in accordance with a reference rule set.

If the AI system arrives at the conclusion that situations and processes depicted in the information data deviate from reference situations and reference processes predefined in the reference rule set and these deviations exceed predefinable deviation threshold values, the AI system can carry out an automated assessment and output indicators regarding a presumed hazardous situation to an entity responsible for the safety of the aircraft passenger compartment. On the basis of such indicators, a reaction can be instigated either in an automated manner by means of downstream systems or individually after assessment by means of human users.

One particular advantage in solutions embodying the invention is that hazardous situations can be recognized as such more easily, more reliably and more quickly, without the need for permanent storage of information data. Storage of information data without cause could intrude upon personal rights of observed persons on account of the unpredictability of the observed situations and processes—this is advantageously avoided by the solutions according to the invention since only indicators about the presumed presence of hazardous situations, which indicators are abstracted from the information material actually recorded, need be stored.

This advantageously enables a compromise between preserving the private sphere of passengers and the surveillance measures necessary for maintaining flight safety. With the solutions according to the invention, various potentially problematic situations can be rapidly discriminated from expected or unproblematic situations in aircraft passenger compartments. By way of example, persons or objects in regions to be kept free, objects blocking emergency exits, objects endangering flight safety owing to their nature, persons requiring assistance, persons acting improperly or persons acting with criminal intent can be recognized and indicated in an automated manner to the on-board personnel for the initiation of countermeasures.

In accordance with some embodiments of the situation recognition device, the rule set generator of the AI system can be designed, on the basis of temporally and spatially resolved observation data about situations and processes in an aircraft passenger compartment, said observation data being received via the input interface of the surveillance processor, to detect patterns and regularities in the observation data and to store the detected patterns and regularities in the observation data as a reference rule set in the reference rule set memory. As a result, the reference rule set can advantageously be adapted adaptively to the respective environment of the aircraft passenger compartment by means of training of the AI system.

In accordance with some further embodiments of the situation recognition device, the situation recognition device can comprise an indicator data memory, which is coupled to the surveillance processor and which is designed to store a multiplicity of indicator signal predefinitions, wherein the surveillance processor is designed, depending on the type of deviations determined by the AI processor, to retrieve one of the multiplicity of indicator signal predefinitions from the indicator data memory and to output it as indicator signal at the output interface. As a result, the output data of the situation recognition device can be abstracted from the visual and/or acoustic surveillance signals detected, such that sensitive data potentially intruding upon the personal rights of persons situated in the aircraft passenger compartment need not be output. Instead, a hazardous situation can be appraised on the basis of the indicator signals.

In accordance with some further embodiments of the situation recognition device, the rule set generator can comprise a support vector classifier, a neural network, a random forest classifier, a decision tree classifier, a Monte Carlo network or a Bayesian classifier.

In accordance with some further embodiments of the situation recognition device, the visual and/or acoustic surveillance signals can comprise real-time video recordings from one or more surveillance cameras.

In accordance with some further embodiments of the situation recognition device, the surveillance processor can be designed to erase the visual and/or acoustic surveillance signals after checking by the AI processor. This advantageously makes it possible to carry out surveillance of an aircraft passenger compartment without data of aircraft passengers being stored for longer than necessary without cause. In particular, the recorded visual and/or acoustic surveillance signals are used only for the automated situation recognition by the AI system and cannot be passed on to unauthorized third parties.

In accordance with some embodiments of the method, the rule set generator can comprise a support vector classifier, a neural network, a random forest classifier, a decision tree classifier, a Monte Carlo network or a Bayesian classifier. In some embodiments of the method, outputting indicator signals by means of the surveillance processor can be carried out depending on an instantaneous flight phase of an aircraft comprising the aircraft passenger compartment.

In accordance with some embodiments of the aircraft passenger compartment, the aircraft passenger compartment can furthermore comprise a warning signal interface, via which the warning device can output warning signals into the cockpit of an aircraft and/or onto a flight attendant console. This advantageously makes it possible that flight attendants or other crew members, including that more distant work areas in the aircraft, can be informed about potential hazardous situations in an aircraft passenger compartment. Particularly for lower deck passenger compartments, which cannot be reached by on-board personnel without traversing relatively long distances, the AI-based automated surveillance can be helpful as a supporting tool for monitoring flight safety.

The above configurations and developments can be combined with one another in any desired way, in so far as is practical. Further possible configurations, developments and implementations of the invention also encompass not explicitly mentioned combinations of features of the invention described above or below with respect to the exemplary embodiments. In particular, in this case the person skilled in the art will also add individual aspects as improvements or supplementations to the respective basic form of the present invention.

BRIEF INDICATION OF THE CONTENTS OF THE FIGURES

The present invention is explained in greater detail below on the basis of the exemplary embodiments indicated in the schematic figures, in which.

Figure 1:
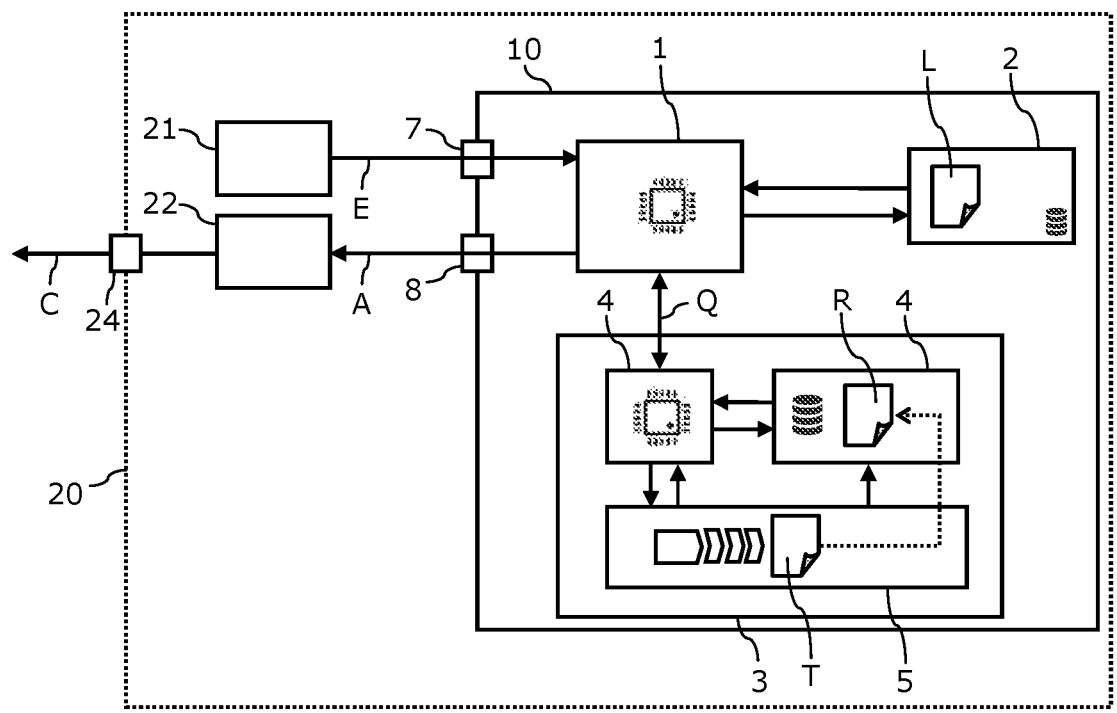
FIG. 1 shows a schematic block diagram of a situation recognition device in an aircraft passenger compartment in accordance with one embodiment of the invention.

The accompanying figures are intended to convey a further understanding of the embodiments of the invention. They illustrate embodiments and, in association with the description, serve to explain principles and concepts of the invention. Other embodiments and many of the advantages mentioned are evident in regard to the drawings. The elements in the drawings are not necessarily shown in a manner true to scale with respect to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, identical, functionally identical and identically acting elements, features and components—unless explained otherwise—are provided with the same reference signs in each case.

DESCRIPTION OF EXEMPLARY EMBODIMENTS

The following description refers to self-learning algorithms used in a system of artificial intelligence (AI system).

In general terms, a self-learning algorithm emulates cognitive functions which, according to human judgement, are assigned to a human cognitive ability. In this case, as a result of new training information being added, the self-learning algorithm can dynamically adapt the knowledge gained heretofore from old training information to the changed circumstances in order to recognize and extrapolate patterns and regularities in the totality of the training information.

In self-learning algorithms within the meaning of the present invention, it is possible to use all kinds of training forming the human acquisition of knowledge, such as, for example, supervised learning, partially supervised learning, independent learning on the basis of generative, non-generative or deep adversarial networks (AN), reinforcement learning or active learning. In this case, feature-based learning ("representation learning") can be used in each instance. The self-learning algorithms within the meaning of the present invention can perform, in particular, an iterative adaptation of parameters and features to be learned by way of feedback analysis.

A self-learning algorithm within the meaning of the present invention can be based on a support vector classifier (SVN), a neural network such as, for instance, a convolutional neural network (CNN), a Kohonen network, a recurrent neural network, a time-delayed neural network (TDNN) or an oscillatory neural network (ONN), a random forest classifier, a decision tree classifier, a Monte Carlo network or a Bayesian classifier. In this case, a self-learning algorithm within the meaning of the present invention can use property-hereditary algorithms, k-means algorithms such as, for instance, Lloyd's or MacQueen's algorithms or TD learning algorithms, such as, for instance, SARSA or Q-learning.

Aircraft passenger compartments within the meaning of the present invention can comprise, in particular, all modularly constructed cabin monuments designed for the conveyance of passengers and the stay thereof during an aircraft journey. Such aircraft passenger compartments can be designed as lower deck passenger compartments, for example. Examples of such lower deck passenger compartments, these examples not limiting the invention, are disclosed on the Internet at https://www.safran-cabin.com/printpdf/media/airbus-and-zodiac-aerospace-enter-partnership-new-lower-deck-sleeping-facilities-20180410.

FIG. 1 shows an exemplary illustration of a situation recognition device 10. The situation recognition device 10 comprises a surveillance processor 1 having an input interface 7 and an output interface 8. Firstly, visual and/or acoustic surveillance signals E from an aircraft passenger compartment 20 can be received at the input interface 7, for example from surveillance devices such as surveillance cameras 21, for instance, which are fitted at strategic surveillance points in the aircraft passenger compartment 20. Secondly, temporally and spatially resolved observation data about situations and processes in an aircraft passenger compartment 20 can be transmitted to the surveillance processor 1 via the input interface 7, from which data patterns and regularities can be derived. Said temporally and spatially resolved observation data can be for example likewise data recorded by surveillance cameras during real operation of the aircraft passenger compartment 20 or data transmitted to the surveillance processor 1 as computer-generated training data by connected further systems.

The situation recognition device 10 additionally comprises an AI system 3. The AI system 3 comprises an AI processor 4, a rule set generator 5 based on self-learning algorithms, and a reference rule set memory 6. The AI system 3 is in bidirectional data communication with the surveillance processor 1 via the AI processor 4. The surveillance processor 1 can communicate to the AI system 3 firstly a multiplicity of historical and/or current observation data about situations and processes in the aircraft passenger compartment 20. Said observation data can serve as a basis for the detection of patterns and regularities regarding possible situations and processes by means of the rule set generator 5. The rule set generator 5 can comprise for example a support vector classifier, a neural network, a random forest classifier, a decision tree classifier, a Monte Carlo network or a Bayesian classifier.

The detected patterns and regularities in the situations and processes are firstly stored iteratively in a training rule set T, which is dynamically and constantly updated. An operative reference rule set R is formed from the training rule set T and is stored in the reference rule set memory 6 by the rule set generator 5. If the AI processor 4 then receives a request Q from the surveillance processor 1 to check data patterns in received visual and/or acoustic surveillance signals E for deviations from data patterns that are to be expected and are classified as non-critical, the AI processor 4 has recourse, as reference, to the reference rule set R stored in the reference rule set memory 6. In relation to this reference, the AI processor 4 checks whether deviations from situations or processes that are expected or should be regarded as normal have occurred within the monitored region of the aircraft passenger compartment 20. The rule set generator 5 can update the reference rule set R stored in the reference rule set memory 6 at periodic intervals on the basis of newly added observation data or on the basis of new external predefinitions.

The results of the deviation analysis are communicated back to the surveillance processor 1, which is then designed to output indicator signals A via the output interface 8 if the deviations determined by the AI processor 4 exceed one or more predefinable deviation threshold values.

An indicator data memory 2 can be coupled to the surveillance processor 1. Said indicator data memory 2 serves for temporarily or permanently storing a multiplicity of indicator signal predefinitions L, which can be accessed by the surveillance processor 1 in order, depending on the type of deviations determined by the AI processor 4, to retrieve one of the multiplicity of indicator signal predefinitions L from the indicator data memory 2 and to output it as indicator signal A at the output interface 8.

A warning device 22 is connected to the output interface 8. Said warning device 22 can be used to indicate to a user, depending on received indicator signals A of the surveillance processor 1, warning indications about a potential hazardous situation in the aircraft passenger compartment 20, without actual image or sound recordings from the aircraft passenger compartment 20 having to be indicated. This can contribute to preserving the private sphere of aircraft passengers in the monitored compartment 20.

Figure 3:
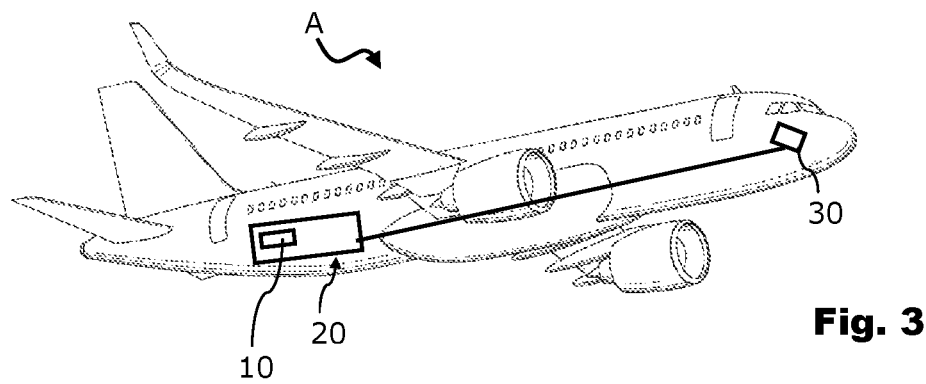
FIG. 3 shows a schematic Illustration of an aircraft comprising a passenger compartment and a situation recognition device in accordance with a further embodiment of the invention.

As illustrated by way of example in FIG. 3, the situation recognition device 10 can be installed in an aircraft passenger compartment 20 of a passenger aircraft A. For this purpose, one or more surveillance cameras 21 in the aircraft passenger compartment 20 can be coupled to the input interface 7 of the surveillance processor 1 in order to transmit visual and/or acoustic surveillance signals E in real time to the surveillance processor 1. The aircraft passenger compartment 20 can additionally have a warning signal interface 24, via which the warning device 22 can output warning signals C into the cockpit of the aircraft A and/or onto a flight attendant console 30.

Advantageously, all components of the situation recognition device 10 and also the warning device 22 can be installed in the aircraft passenger compartment 20. However, it may also be possible to install individual components or system constituents outside the aircraft passenger compartment 20.

Figure 2:
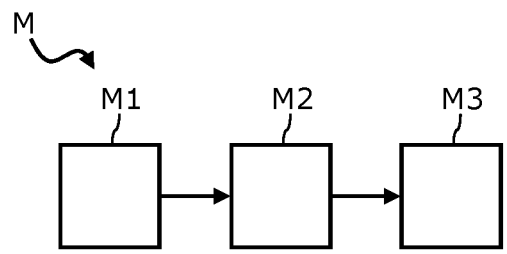
FIG. 2 shows a flow diagram of a method for surveillance of traffic movements in accordance with a further embodiment of the invention.

FIG. 2 shows a method M for automated surveillance of processes and situations in aircraft passenger compartments. The method M can be implemented for example in a situation recognition device 10 as illustrated by way of example in FIG. 1 and can be used for surveillance of aircraft passenger compartments 20 as illustrated by way of example in FIG. 1, for example in a passenger aircraft A, as illustrated and elucidated by way of example in FIG. 3.

The method M comprises, as a first step M1, receiving visual and/or acoustic surveillance signals E from an aircraft passenger compartment 20 by means of a surveillance processor 1. In this case, the situation recognition device 10 can be for example part of an electronic data processing system in which the observation data about traffic movements are recorded, processed and stored only temporarily. In a second step M2, the received visual and/or acoustic surveillance signals E are checked for deviations from a reference rule set R stored in a reference rule set memory 6 of an AI system 3 and generated by a rule set generator 5 based on self-learning algorithms, by means of an AI processor 4 of the AI system 3. This is effected by means of a rule set generator 5 of an AI system 3 which is based on self-learning algorithms. Such a rule set generator 5 can comprise for example a support vector classifier, a neural network, a random forest classifier, a decision tree classifier, a Monte Carlo network or a Bayesian classifier.

In iterative and dynamically adaptive learning processes, a training rule set T can be generated in the rule set generator 5. Said training rule set T can be generated once or be continuously updated, in particular in the course of ongoing reception of current observation data about situations and processes in the aircraft passenger compartment 20. The rule set generator 5 can generate a reference rule set R from the training rule set T, said reference rule set being based on the patterns and regularities detected by the rule set generator 5. The reference rule set R is stored in the reference rule set memory 6 of the AI system 3 by the rule set generator 5. Said reference rule set R constitutes the operative rule set with the aid of which data patterns in received visual and/or acoustic surveillance signals E are checked for deviations from data patterns that are to be expected and are classified as non-critical. For this purpose, the AI processor 4 has recourse, as reference, to the reference rule set R stored in the reference rule set memory 6. In relation to said reference, the AI processor 4 checks whether deviations from situations or processes that are expected or should be regarded as normal have occurred within the monitored region of the aircraft passenger compartment 20.

In a third step M3 of the method M, finally, indicator signals A are output by the surveillance processor 1 if the deviations determined by the AI processor 4 exceed one or more predefinable deviation threshold values. Said indicator signals A serve to make human users aware of the presence of situations or processes that should be regarded as unusual in the aircraft passenger compartment 20. The situations or processes classified as unusual can then be fed in an automated or partly automated manner into a system for initiating suitable reaction measures in order to be able to react at an early stage to the occurrence of potential dangers to flight safety. In particular, it may be possible to output the indicator signals A in a manner dependent on a flight phase.

By way of example, during an aircraft takeoff or landing process, it may be necessary for specific regions such as emergency exits, for instance, to be kept free of objects such as bags or suitcases which are permitted to be put there temporarily during cruising flight or while the aircraft stays on the ground. Therefore, the surveillance processor 1 can be connected to an aircraft network in order to obtain operating status signals of the aircraft, which can be included in the decision taken by the surveillance processor 1 as to whether and which indicator signals A ought to be output.

In the detailed description above, various features have been summarized in one or more examples in order to improve the rigorousness of the presentation. It should be clear here, however, that the above description is merely illustrative, but in no way restrictive, in nature. It serves to cover all alternatives, modifications and equivalents of the various features and exemplary embodiments. Many other examples will be immediately and directly clear to the person skilled in the art on the basis of the latter's technical knowledge in view of the above description.

The exemplary embodiments have been chosen and described in order that the principles underlying the invention and the possibilities for application thereof in practice can be presented as well as possible. As a result, those skilled in the art can modify and utilize the invention and its various exemplary embodiments optimally with respect to the intended purpose of use. In the claims and the description, the terms "including" and "having" are used as terminology expressed in neutral language for the corresponding terms "comprising". Furthermore, a use of the terms "a", "an" and "one" shall not in principle exclude a plurality of features and components described in this way.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. The term 'or' shall be interpreted as 'and/or' unless the context requires otherwise.

The invention claimed is:

1. A situation recognition device comprising:
    a surveillance processor including an input interface and an output interface, said surveillance processor configured to receive visual and/or acoustic surveillance signals from an aircraft passenger compartment via the input interface; and
    an artificial intelligence (AI) system comprising an AI processor, a rule set generator based on self-learning algorithms, and a reference rule set memory, said AI system in bidirectional data communication with the surveillance processor,
    wherein the AI processor is configured to check, upon a request from the surveillance processor, data patterns in the received visual and/or acoustic surveillance signals for deviations from data patterns in a reference rule set stored in the reference rule set memory,
    wherein the surveillance processor is configured to output indicator signals via the output interface if the deviations determined by the AI processor exceed one or more predefinable deviation threshold values, and an indicator data memory coupled to the surveillance processor and configured to store a multiplicity of indicator signal predefinitions, wherein the surveillance processor is configured, depending on the type of deviations determined by the AI processor, to retrieve one of the multiplicity of indicator signal predefinitions from the indicator data memory and to output the one of the multiplicity of the indicator signal predefinitions as an indicator signal at the output interface, and wherein the rule set generator comprises at least one of: a support vector classifier, a neural network, a random forest classifier, a decision tree classifier, a Monte Carlo network and a Bayesian classifier.

2. The situation recognition device according to claim 1, wherein the rule set generator of the AI system is configured, on the basis of temporally and spatially resolved observation data about situations and processes in an aircraft passenger compartment, said observation data being received via the input interface of the surveillance processor, to detect patterns and regularities in the observation data and to store the detected patterns and regularities in the observation data as a reference rule set in the reference rule set memory.

3. The situation recognition device according to claim 1, wherein the visual and/or acoustic surveillance signals comprise real-time video recordings from one or more surveillance cameras.

4. The situation recognition device according to claim 1, wherein the surveillance processor is configured to erase the visual and/or acoustic surveillance signals after checking by the AI processor.

5. An aircraft passenger compartment comprising:
the situation recognition device according to claim 1;
one or more surveillance cameras coupled to the input interface of the surveillance processor and configured to transmit visual and/or acoustic surveillance signals in real time to the surveillance processor; and
a warning device, which is coupled to the output interface of the surveillance processor and which is configured to indicate to a user, depending on received indicator signals from the surveillance processor, warning indications about a potential hazardous situation in the aircraft passenger compartment.

6. The aircraft passenger compartment according to claim 5, further comprising a warning signal interface, via which the warning device outputs warning signals to the cockpit of an aircraft and/or onto a flight attendant console in a cabin of the aircraft.

7. A method for automated surveillance of processes and situations in aircraft passenger compartments comprising:
receiving by a surveillance processor visual and/or acoustic surveillance signals from an aircraft passenger compartment;
checking the received visual and/or acoustic surveillance signals for deviations from a reference rule set stored in a reference rule set memory of an artificial intelligence (AI) system and generated by a rule set generator based on self-learning algorithms by an AI processor in the AI system; outputting indicator signals by the surveillance processor if the deviations determined by the AI processor exceed one or more predefinable deviation threshold values, and an indicator data memory coupled to the surveillance processor and configured to store a multiplicity of indicator signal predefinitions, wherein the surveillance processor is configured, depending on the type of deviations determined by the AI processor, to retrieve one of the multiplicity of indicator signal predefinitions from the indicator data memory and to output the one of the multiplicity of the indicator signal predefinitions as an indicator signal at the output interface, wherein the rule set generator comprises at least one of: a support vector classifier, a neural network, a random forest classifier, a decision tree classifier, a Monte Carlo network and a Bayesian classifier.

8. The method according to claim 7, wherein the rule set generator comprises at least one of a support vector classifier, a neural network, a random forest classifier, a decision tree classifier, a Monte Carlo network and a Bayesian classifier.

9. The method according to claim 7, wherein the outputted indicator signals by the surveillance processor is carried out depending on a flight phase of an aircraft comprising the aircraft passenger compartment.

* * * * *